(12) United States Patent
Fujii et al.

(10) Patent No.: US 10,637,076 B2
(45) Date of Patent: Apr. 28, 2020

(54) ASSEMBLY, FUEL CELL USING SAME, AND METHOD OF DISASSEMBLING SAME

(71) Applicant: Panasonic Intellectual Property Management Co., Ltd., Osaka (JP)

(72) Inventors: Tsutomu Fujii, Osaka (JP); Mitsuo Yoshimura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 425 days.

(21) Appl. No.: 15/131,864

(22) Filed: Apr. 18, 2016

(65) Prior Publication Data

US 2016/0359177 A1 Dec. 8, 2016

(30) Foreign Application Priority Data

Jun. 2, 2015 (JP) .................................. 2015-111878
Jan. 15, 2016 (JP) .................................. 2016-005685

(51) Int. Cl.
*H01M 8/0273* (2016.01)
*H01M 8/008* (2016.01)
(Continued)

(52) U.S. Cl.
CPC ......... *H01M 8/0273* (2013.01); *H01M 8/006* (2013.01); *H01M 8/008* (2013.01); *H01M 8/026* (2013.01); *H01M 8/0276* (2013.01); *H01M 8/1004* (2013.01); *H01M 8/1007* (2016.02); *H01M 8/1018* (2013.01);
(Continued)

(58) Field of Classification Search
CPC .... H01M 8/0273; H01M 8/008; H01M 8/006; H01M 8/2457; H01M 8/1007; H01M 8/026; H01M 8/0276; H01M 8/1004; H01M 8/1018; H01M 8/242; H01M 2300/0002; H01M 2300/0082; H01M 2008/1095; Y02W 30/86
See application file for complete search history.

(56) References Cited

U.S. PATENT DOCUMENTS

2007/0212587 A1* 9/2007 Fragiadakis ............. F16J 15/14
429/483
2009/0136811 A1* 5/2009 Kusakabe ........... H01M 8/0273
429/492
(Continued)

FOREIGN PATENT DOCUMENTS

EP 2293371 A1 * 3/2011 .......... H01M 8/0273
EP 2942830 11/2015
(Continued)

OTHER PUBLICATIONS

The Extended European Search Report dated Aug. 9, 2016 for the related European Patent Application No. 16167103.7.

*Primary Examiner* — Milton I Cano
*Assistant Examiner* — Philip A. Stuckey
(74) *Attorney, Agent, or Firm* — Panasonic IP Management; Kerry S. Culpepper

(57) ABSTRACT

An assembly, including: an electrolyte membrane; and a frame that holds the electrolyte membrane, wherein the frame includes a first frame that holds one surface of the electrolyte membrane, and a second frame that holds the other surface of the electrolyte membrane, the frame further has a joint part that joins the first frame and the second frame, and the joint part has a projection.

12 Claims, 9 Drawing Sheets

(51) Int. Cl.
*H01M 8/00* (2016.01)
*H01M 8/2457* (2016.01)
*H01M 8/1007* (2016.01)
*H01M 8/026* (2016.01)
*H01M 8/0276* (2016.01)
*H01M 8/1004* (2016.01)
*H01M 8/1018* (2016.01)
*H01M 8/242* (2016.01)

(52) U.S. Cl.
CPC ......... *H01M 8/242* (2013.01); *H01M 8/2457* (2016.02); *H01M 2008/1095* (2013.01); *H01M 2300/0002* (2013.01); *H01M 2300/0082* (2013.01); *Y02W 30/86* (2015.05)

(56) References Cited

U.S. PATENT DOCUMENTS

| | | | |
|---|---|---|---|
| 2011/0143252 A1 | 6/2011 | Unoki et al. | |
| 2011/0177423 A1* | 7/2011 | Nachtmann | H01M 8/0273 |
| | | | 429/480 |
| 2013/0157164 A1* | 6/2013 | Yamauchi | H01M 8/0273 |
| | | | 429/480 |
| 2014/0377679 A1* | 12/2014 | Yamamoto | H01M 8/006 |
| | | | 429/454 |
| 2015/0072264 A1* | 3/2015 | Yaginuma | H01M 8/0232 |
| | | | 429/480 |

FOREIGN PATENT DOCUMENTS

| | | | |
|---|---|---|---|
| WO | 2009/144940 | 12/2009 | |
| WO | WO-2013161200 A1 * | 10/2013 | ............ H01M 8/006 |
| WO | 2014/171055 A1 | 10/2014 | |

* cited by examiner

ASSEMBLY, FUEL CELL USING SAME, AND METHOD OF DISASSEMBLING SAME

CROSS-REFERENCE TO RELATED APPLICATIONS

The present application claims the benefit of foreign priority to Japanese patent applications 2015-111878 filed on Jun. 2, 2015 and 2016-005685 filed on Jan. 15, 2016, the contents both of which are incorporated by reference.

TECHNICAL FIELD

The technical field relates to an assembly, a fuel cell using the same, and a method of disassembling the same.

BACKGROUND

A polymer electrolyte fuel cell (PEFC) is an apparatus that causes a fuel gas containing hydrogen and an oxidant gas containing oxygen, such as the air, to electrochemically react with each other, thereby simultaneously generating electric power and heat.

Basic components of the PEFC are shown in the cross-sectional view of FIG. 6. At first, there are an electrolyte membrane 15 that selectively transports hydrogen ions, and an anode electrode 22 and a cathode electrode 23 that are formed on the surfaces of the electrolyte membrane 15. These electrodes have an anode catalyst layer 16 and a cathode catalyst layer 17 that are formed on surfaces of the electrolyte membrane 15, as well as gas diffusion layers 18 (GDLs) that are placed on the external sides of the catalyst layers and that combine air permeability and electronic conductivity.

An assembly obtained by thus joining the electrolyte membrane 15, the anode electrode 22 and the cathode electrode 23 in a unified manner is called a membrane electrode assembly of an electrolyte membrane and electrodes (Membrane Electrode Assembly; MEA). Hereinafter, this is referred to as "MEA 10."

Moreover, a frame 9 is put on the outer periphery of the MEA 10, thereby forming an assembly 14. A cross-sectional view of the outer peripheral portion is shown in FIG. 7. The frame 9 is put on the outer periphery of the MEA 10. Conductive separators 11 for fixing the MEA with the MEA mechanically placed therebetween and for electrically connecting adjacent MEAs 10 to each other in series are placed at both sides of the MEA 10. Gas flow channel grooves 13 for supplying a reaction gas to each electrode and for carrying generated water or surplus gases away are formed on portions of the separators 11 that are in contact with the MEA 10. The structure in which the MEA 10 is placed between the pair of separators 11 is called a single cell module, or simply cell 2.

Furthermore, in order to supply the reaction gas to the gas flow channel grooves 13, manifold holes are provided on the peripheral parts of separators 11, thereby distributing the reaction gas. Additionally, in order to prevent the reaction gas, etc. supplied to the gas flow channel grooves 13 from leaking to the outside or mixing, sealing members 20 (gaskets) are placed between the pair of separators 11 so that the sealing members 20 surround electrode-forming parts of the MEA 10, i.e., the outer periphery of the power generation region.

Here, precious metals such as platinum are used for electrodes of the MEA 10. When the MEA 10 is discarded, the MEA 10 is removed from the portion of frame 9, and precious metals included in the electrodes should be collected and recycled.

A method of disassembling a conventional assembly 14 of electrolyte is shown with reference to cross-sectional views of FIGS. 8A and 8B. As shown in FIG. 8A, there is a method in which a separation part 24 (shown by dashed lines) for splitting the frame 9 into two or more pieces is formed therein, and the frame 9 is separated from the separation part 24 serving as a starting point, to thereby remove the MEA 10 (for example, WO/2009/144940).

FIG. 9 is a diagram that shows a configuration of the conventional electrolyte assembly described in WO/2009/144940. In FIG. 9, a frame 105 is joined to the outer peripheral part of a MEA 101. Bolt holes 102 for fastening stacked single cells, manifold holes 103 for supplying gases, and gaskets 104 for sealing gases are placed on the frame 105, and a cutoff line 106 is formed around the inner peripheral part. By such a configuration, upon disassembling the electrolyte assembly, the inner peripheral part of the frame 105 is separated using the cutoff line 106, and the MEA 101 is removed therefrom.

SUMMARY

However, since the separation part 24 (FIG. 8A) of the frame 9 is in contact with the electrolyte membrane of the MEA 10 in the conventional configuration, there is a concern that the MEA 10 will be damaged due to breakage or the like of the membrane during separation from the frame 9. Therefore, the conventional configuration has a problem in which it is difficult to disassemble the MEA 10 without causing damage thereto.

In view of the above-described problem in conventional arts, as well as other concerns, it is a concern of the present disclosure to provide as assembly that makes it possible to collect and recycle the MEA without causing damage thereto, a fuel cell using the same, and a method of disassembling the same.

Accordingly, an assembly, includes: an electrolyte membrane; and a frame that holds the electrolyte membrane, wherein the frame includes a first frame that holds one surface of the electrolyte membrane, and a second frame that holds the other surface of the electrolyte membrane, the frame further has a joint part that joins the first frame and the second frame, and the joint part includes a projection.

Moreover, a fuel cell, includes plural single cell modules that are stacked. Each of the modules has the above assembly and a pair of separators with the assembly placed therebetween is provided.

Furthermore, a method of disassembling an assembly, including: deforming a peripheral part of a projection on the projecting side in a second frame so that the peripheral part warps, to thereby remove the projection from the second frame; and stripping the joint part and the first frame from the second frame with the projection, wherein, in the assembly, a peripheral part of an electrolyte membrane is placed between the second frame and the first frame that has an outer diameter size smaller than that of the second frame, the combined portion of the second frame and the first frame is covered with the joint part, and the joint part is provided with the projection is provided.

As described above, according to the electrolyte assembly of, MEAs including precious metals can be collected from used polymer electrolyte fuel cells, defective products generated in the production steps, etc., without causing damage to the MEAs, and can be recycled.

DESCRIPTION OF EMBODIMENTS

Hereinafter, various exemplary embodiments will be described with reference to the drawings.

First Embodiment

For example, the fuel cell is a polymer electrolyte fuel cell (PEFC), and causes a fuel gas containing hydrogen and an oxidant gas containing oxygen, such as the air, to electrochemically react with each other, thereby simultaneously generating electric power, heat and water.

Figure 1:
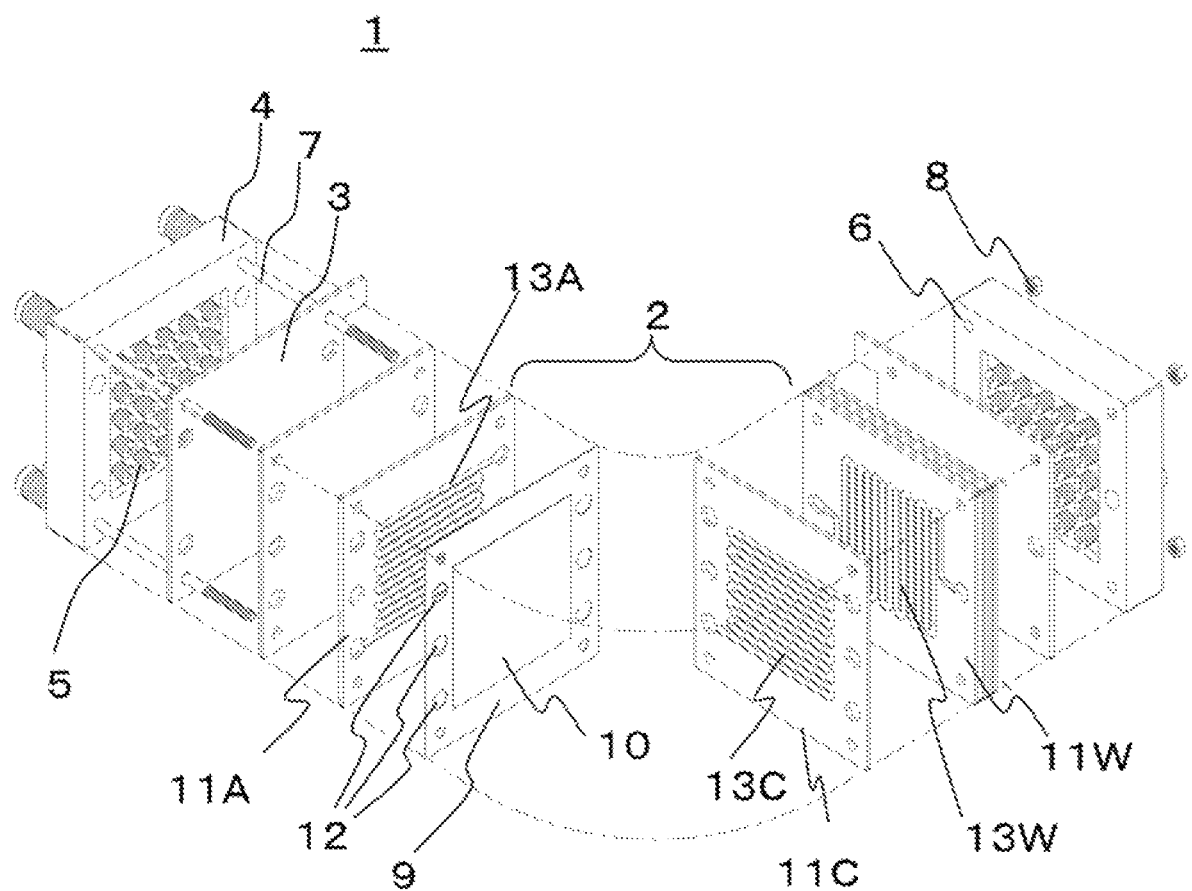
FIG. 1 shows an exploded perspective view of a fuel cell stack according to an embodiment.

FIG. 1 is a perspective view that schematically shows a structure of a fuel cell stack 1 that is one example of the polymer electrolyte fuel cell (PEFC) according to the embodiment, where a part of the structure is exploded. As shown in FIG. 1, the fuel cell stack 1 is formed by stacking plural cells 2, which are single cell modules, in series. Additionally, current plates 3, end plates 4, and springs 5 are attached to outermost layers at both edges of each cell 2, and each cell 2 is configured by being fastened from the both edges with fastening bolts 7 that is inserted through bolt holes 6, and nuts 8.

<Current Plate 3>

The current plate 3 is a plate that is placed at the outer side of the stack of the cell 2. For the current plate 3, a material obtained by subjecting a copper plate to gold plating is used so that the generated electricity can efficiently be collected. Additionally, for the current plate 3, metal materials with sufficient electrical conductivity, for example, iron, stainless steel, aluminum, etc. may be used. In addition, for surface treatments to the current plate 3, tin plating, nickel plating, or the like may be adopted.

The end plate 4 with high electric insulation is placed at the external side of the current plate 3 in order to insulate the electricity. In this case, for the end plate 4, a material produced by injection molding using a polyphenylene sulfide resin can be used. In addition, for the end plate material, not only thermoplastic resins but also thermosetting materials can be used. The pipe that is integrated with the end plate 4 is configured by being pressed against a manifold of the stack of the cell 2 via a gasket. However, the end plate and the pipe can be separated. Inside the end plate 4, springs 5 that apply a load to the cell 2 are placed in clusters in a projected part of the MEA, namely inside the cell 2, and are fastened by adjustment with fastening bolts 7 and nuts 8 during the assembly.

<Cell 2>

The MEA 10 having a frame 9 around its peripheral portion is placed between the pair of anode-side separator 11A and cathode-side separator 11C that are electrically conductive, and a cooling water separator 11W is further placed at the external side, thus forming the cell 2.

The anode-side separator 11A and the cathode-side separator 11C are plate-shaped, their surfaces that come into contact with the MEA 10, i.e., their inner surfaces, agree with the shape of MEA 10. Various types of manifold holes 12 and bolt holes 6 penetrate through the anode-side separator 11A and the cathode-side separator 11C in the thickness directions. Additionally, a fuel gas flow channel groove 13A and an oxidant gas flow channel groove 13C are formed on the inner surfaces of the anode-side separator 11A and the cathode-side separator 11C, a cooling water flow channel groove 13W is formed on the back surfaces of the anode-side separator 11A and the cathode-side separator 11C. It is sufficient that the anode-side separator 11A and the cathode-side separator 11C be a gas-impermeable electrically-conductive material, and, for example, a resin-impregnated carbon material that has been cut into a predetermined shape, a material obtained by molding a mixture of a carbon powder and a resin material, or a molded metal can be used therefore.

<Frame 9>

Pairs of through-holes thorough which the fuel gas, the oxidant gas and the cooling water respectively flow, i.e., manifold holes 12, are provided in the flame 9 placed around the peripheral portion of the MEA 10. In a state where the cells 2 are laminated, these through-holes are stacked, and are bonded with each other to form manifold holes 12 for the fuel gas/oxidant gas/cooling water. For the frame 9, a material obtained by subjecting a polyphenylene ether resin, which has excellent chemical resistance, heat resistance and insulation resistance, to injection molding can be used. However, thermoplastic resins such as polyphenylene sulfide, polypropylene or polyethylene, or thermosetting resins such as epoxy can also be used therefore.

A gasket is present although it is not shown in the figures. The gasket is an elastic body, and is formed integrally with the anode-side separator 11A and the cathode-side separator 11C. It deforms depending on the shape of the frame 9 of the body of MEA 10 by pressing force, such that the outer periphery of the body part of MEA 10 and the outer periphery of the manifold hole 12 are sealed. This prevents the fuel gas, the oxidant gas and the cooling water from leaking from the joined parts of various manifold holes 12 between adjacent cells 2.

Figure 2A:
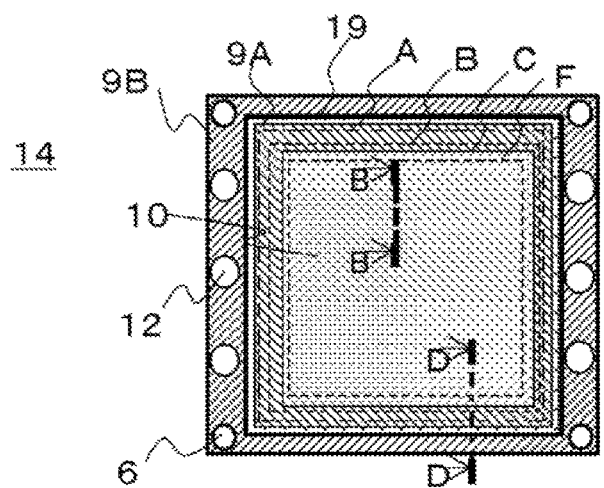
FIG. 2A shows a plan view of an assembly of an electrolyte membrane, electrodes and a frame in a fuel cell according to an embodiment.
Figure 2B:
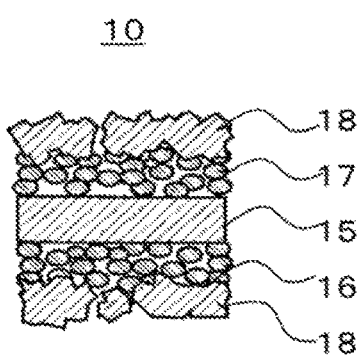
FIG. 2B shows a partial cross-sectional view of an assembly of an electrolyte membrane, electrodes and a frame according to an embodiment.

FIG. 2A is a plan view of the assembly 14, and FIG. 2B is a partial cross-sectional view of FIG. 2A. The frame 9 (a first frame 9A and a second frame 9B) is present around the peripheral portion of the assembly 14.

In the central portion of the assembly 14, the electrolyte membrane 15 is covered with a gas diffusion layer 18. In the edge part of the assembly 14, the electrolyte membrane 15 is placed between the second frame 9B and the first frame 9A. The bolt holes 6 and the manifold holes 12 are placed in the second frame 9B.

Figure 6:
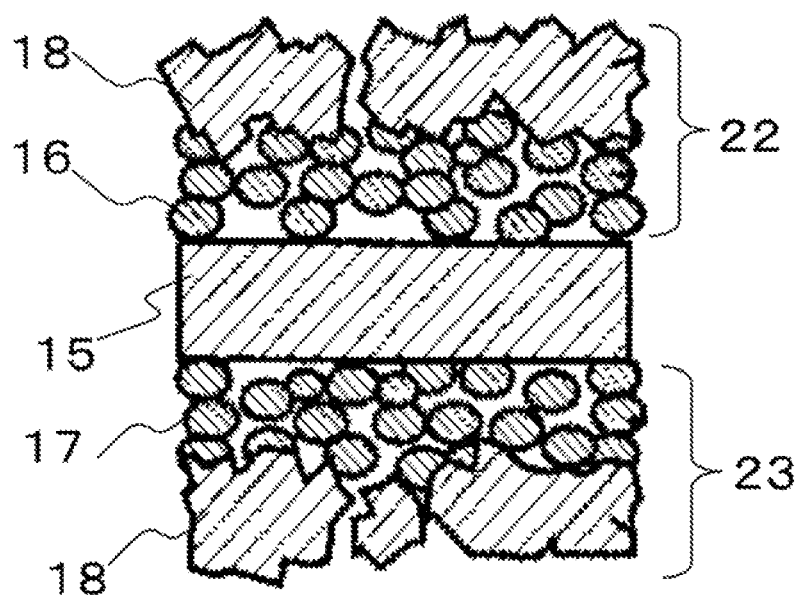
FIG. 6 shows a cross-sectional view of components of a conventional polymer electrolyte fuel cell.
Figure 7:
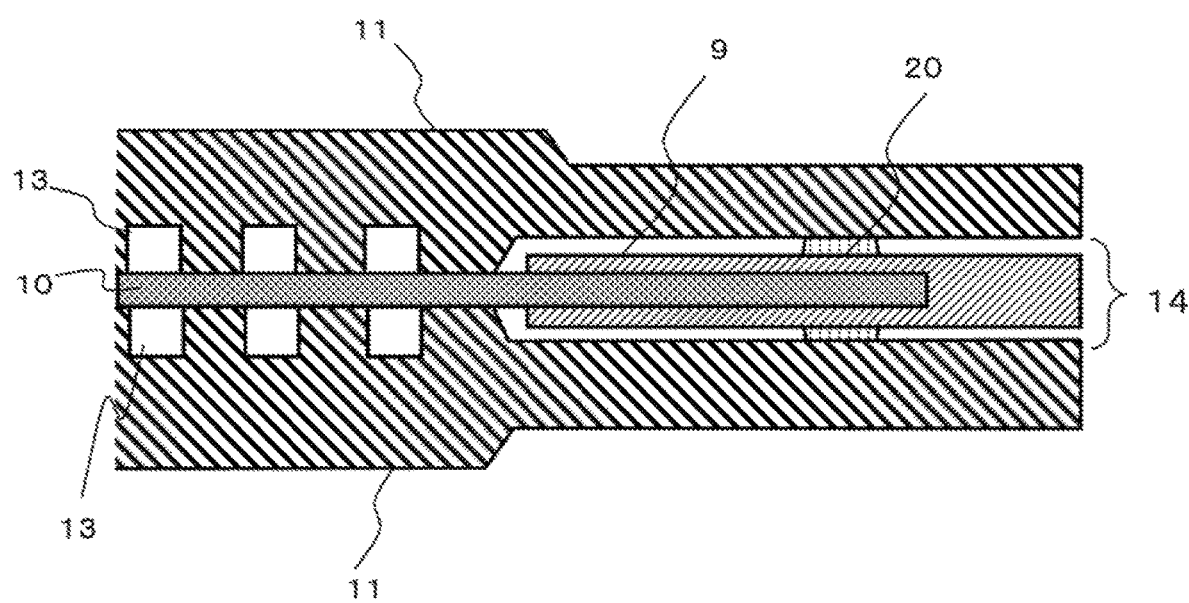
FIG. 7 shows a cross-sectional view of a single cell of a conventional fuel cell.
Figure 8A:
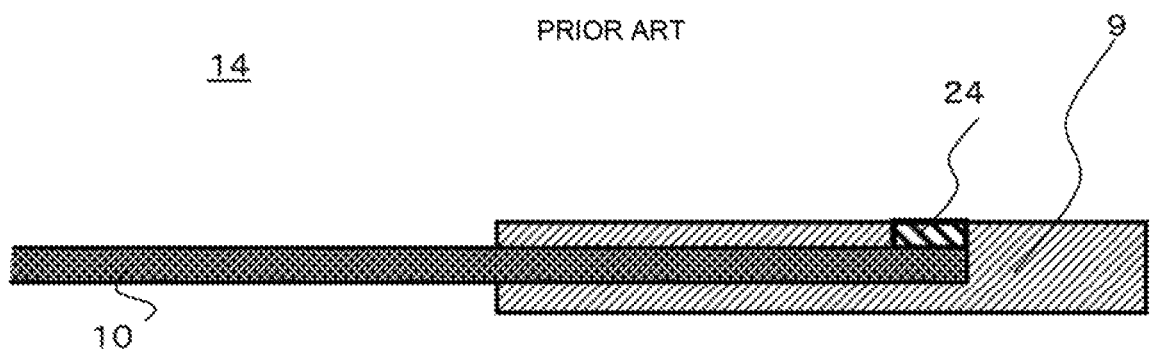
FIGS. 8A and 8B are diagrams that show a method of disassembling a conventional electrolyte assembly.
Figure 8B:
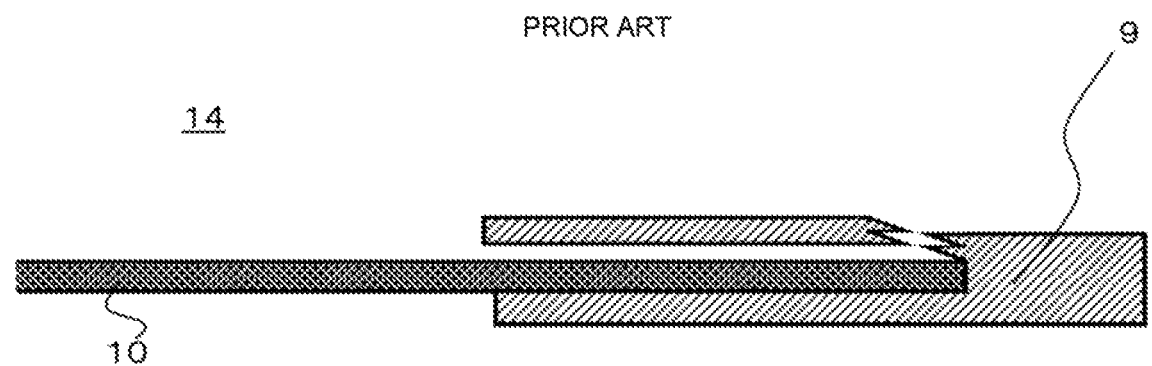
Figure 9:
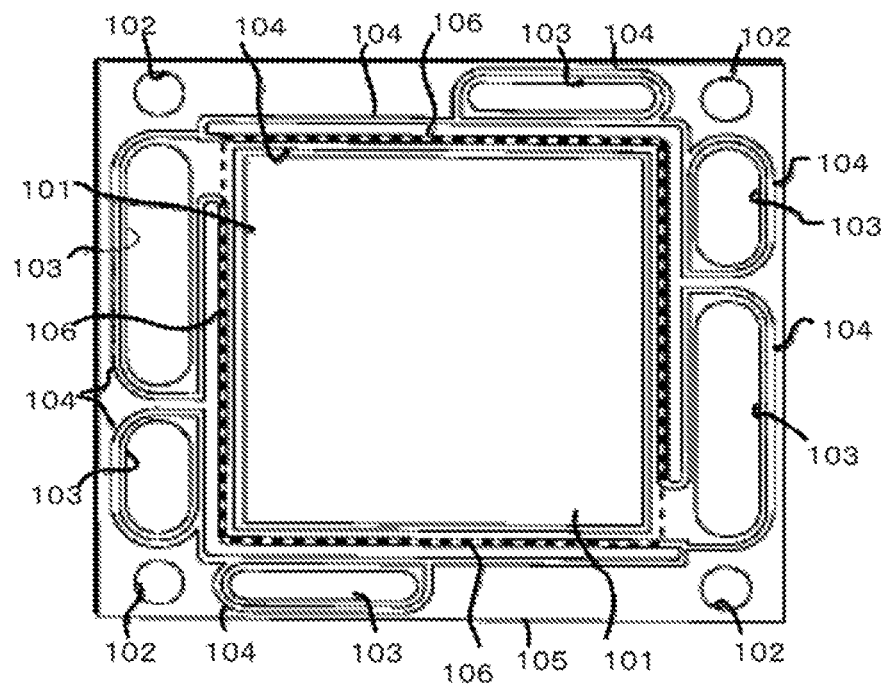
FIG. 9 is a plan view of the conventional assembly of an electrolyte membrane, electrodes, and a frame in WO/2009/144940.

The second frame 9B and the first frame 9A are provided therein so that the stack (FIG. 6) of the electrolyte membrane 15, the gas diffusion layer 18, the anode electrode 22 and the cathode electrode 23 is not exposed.

The partial cross-sectional view of FIG. 2B shows a cross-sectional view of the MEA 10 (a cross-sectional view of the dotted line part of FIG. 2A). In the MEA 10, on the anode surface side of the electrolyte membrane 15 that selectively transports hydrogen ions, an anode catalyst layer 16 that includes, as a main component, a platinum/ruthenium alloy catalyst-supported carbon powder is formed, and, on the cathode surface side of the electrolyte membrane 15, a cathode catalyst layer 17 that includes, as a main component, a platinum catalyst-supported carbon powder is formed. Gas diffusion layers 18 (GDLs) that combine permeability of the fuel gas or the oxidant gas and electronic conductivity are placed on surfaces of the catalyst layers.

For the electrolyte membrane 15, a solid polymer material that exhibits proton conductivity, for example, a perfluorosulfonic acid membrane (nation membrane manufactured by Du Pont) can be used.

<Details of Assembly 14>

Figure 2C:
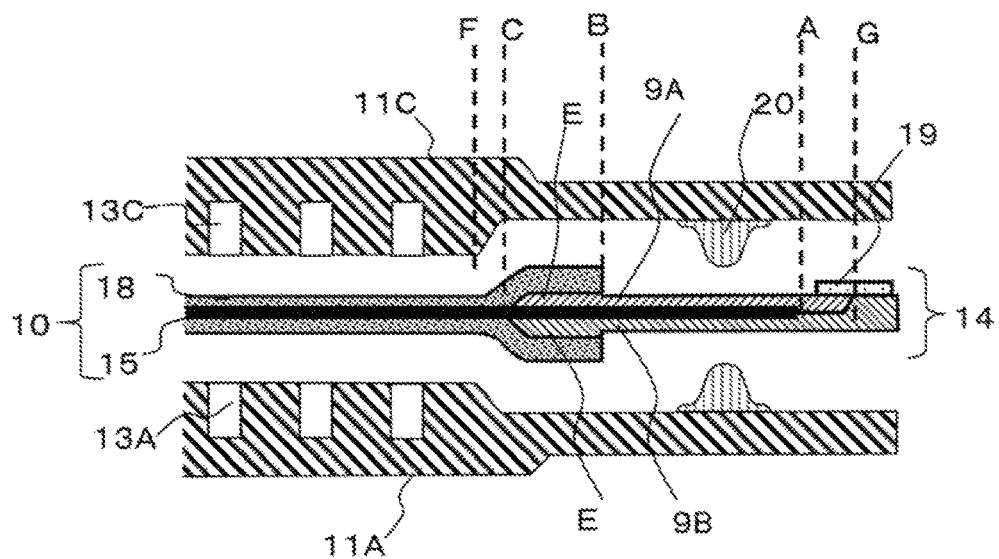
FIGS. 2C and 2D each show plan views of an assembly of an electrolyte membrane, electrodes and a frame according to an embodiment.
Figure 2D:
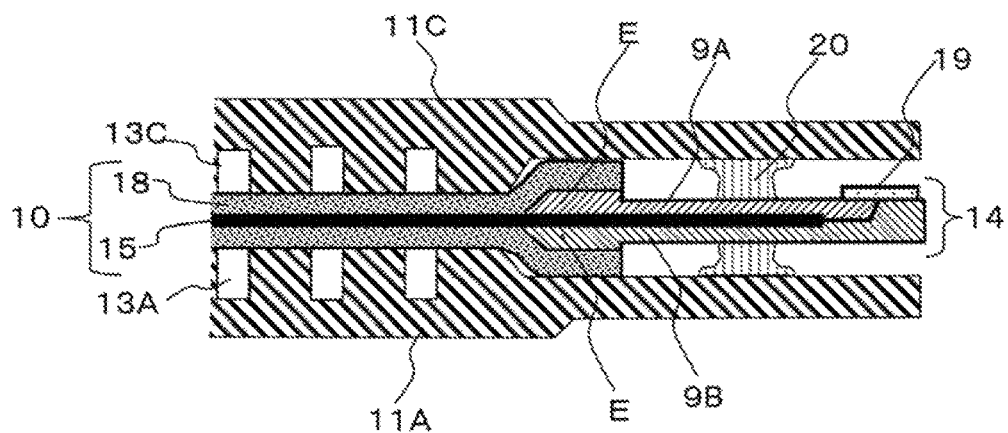

Details of the assembly 14 in this embodiment is shown with reference to the plan view of the assembly 14 of FIG. 2A and the cross-sectional views of FIGS. 2C and 2D.

FIGS. 2C and 2D are cross-sectional views of the edge part (peripheral portion) and the D-D part (FIG. 2A), respectively, of the assembly 14. FIG. 2C refers to before assembling of the assembly 14, and FIG. 2D refers to after assembling of the assembly 14.

The region A is an outer peripheral region of the electrolyte membrane 15, on both surfaces of which, the anode catalyst layer 16 and the cathode catalyst layer 17 (FIG. 2A) are formed.

The region B corresponds to the outer peripheral size of the gas diffusion layer 18 (FIG. 2A).

The region C corresponds to the inner peripheral size of the frame 9 (the first frame 9A and the second frame 9B).

The region F corresponds to an area of the power generation, electrode, and is a part where power generation is conducted.

The outer peripheral size of the gas diffusion layer 18 of the region B is preferably equal to the inner peripheral size of the frame 9 (the first frame 9A and the second frame 9B) of the region C. However, the outer peripheral size may be larger than the inner peripheral size.

As shown in FIGS. 2C and 2D, in the assembly 14, the peripheral part of the electrolyte membrane 15 having the anode catalyst layer 16 and the cathode catalyst layer 17 (FIG. 2B) on the both surfaces is placed between two frame-shaped materials, namely the first frame 9A and the second frame 9B, that are formed of a resin. In that state, as shown in FIG. 2C, a joint part 19 (a joint part of the frames) is formed along the whole periphery by resin forming or the like so that it covers the top of the boundary part G of the inner first frame 9A and the outer second frame 9B. This causes the first frame 9A and the second frame 9B to join with each other. The joint part 19 is preferably a material obtained by subjecting the same thermoplastic resin (e.g. polyphenylene ether resins) as the material for the first frame 9A and the second frame 9B to injection molding. However, a thermosetting adhesive or the like can also be used therefore.

In addition, as seen from FIGS. 2C and 2D, the shapes of the second frame 9B and the outer first frame 9A are different from each other. The second frame 9B is used as a main body, the edge part of the electrolyte membrane 15 is placed in its recess part, and the first frame 9A is placed thereon. Then, as described above, the first frame 9A and the second frame 9B are fixed with the joint part 19. In this case, the first frame 9A and the second frame 9B are tetragon-shaped, have an opening in the centers, and are frame-shaped. They may be a polygon other than a tetragon. In addition, the corners of the polygon may be R-shaped.

Thus, the electrolyte membrane 15 is placed between the first frame 9A and the second frame 9B, and the gas diffusion layers 18 are joined thereto. This makes it possible to form the assembly 14 without applying forming pressure directly to the electrolyte membrane 15 and the gas diffusion layers 18. Consequently, durability of the MEA 10 can be maintained for a long time.

Additionally, as Shown in FIG. 2C, in the assembly 14, gas diffusion layers 18 are configured such that they run on portions E where inner peripheral thicknesses of the first frame 9A and the second frame 9B with the electrolyte membrane 15 placed therebetween are large.

As shown in FIG. 2D, in a state where the assembly 14 is placed between separators 11, the gas diffusion layers 18 that run on the first frame 9A and the second frame 9B are configured such that they fill spaces between them and the separators 11.

Thus, by allowing parts of the outer peripheries of the gas diffusion layers 18 to run on the inner sides of the first frame 9A and the second frame 9B, the electrolyte membrane 15 is prevented from being exposed and coming into direct contact with the gases, resulting in deterioration, and the durability can be improved.

Furthermore, by allowing the gas diffusion layers 18 to run on the first frame 9A and the second frame 9B, the gases are prevented from coming around the outside of region F of the power generation electrode.

<Corner Parts of Joint Part 19>

Figure 3A:
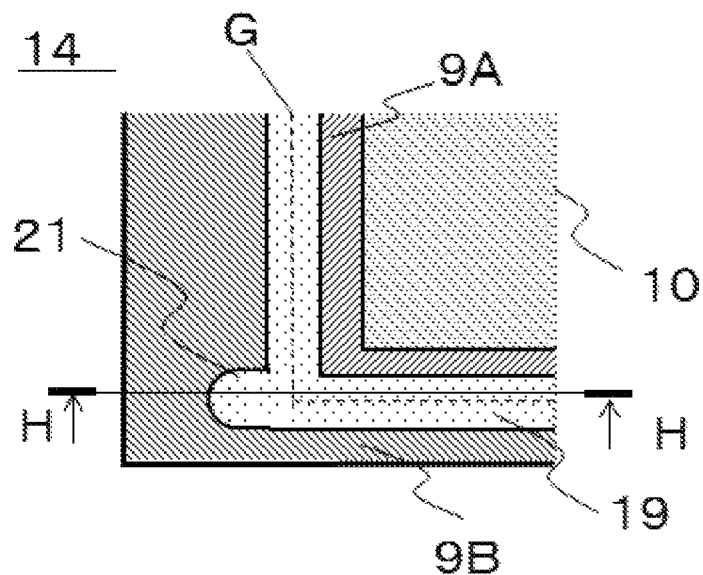
FIG. 3A shows a plan view of a corner part of a frame in a first embodiment of the invention.
Figure 3B:
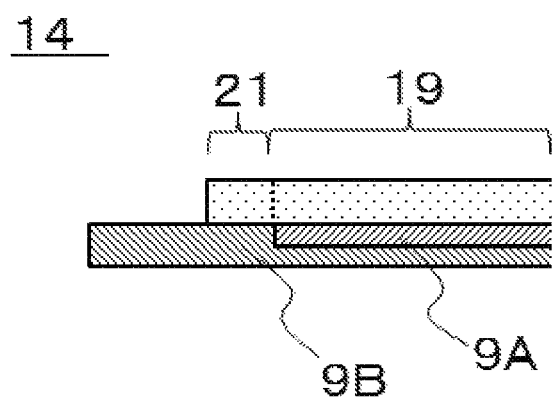
FIG. 3B and FIG. 3C shows a cross-sectional view of the corner part of the frame in the first embodiment of the invention.

Hereinafter, corner parts of the joint part 19 in this embodiment will be described with reference to the plan view of FIG. 3A and the cross-sectional view of FIG. 3B. FIG. 3A is a plan view that shows the shape of corner part of the joint part 19 of the frame 9. FIG. 3B is an H-H cross-sectional view that shows a configuration of the corner part of the joint part 19 of the first frame 9A and the second frame 9B in FIG. 3A.

In forming the assembly 14, it is sufficient that the joint part 19 of the frame joins the first frame 9A and the second frame 9B in the boundary portion G (FIG. 2C).

The joint part 19 is formed over both the top surfaces of the first frame 9A and the second frame 9B. In addition, the top surfaces of the first frame 9A and the second frame 9B preferably form the same plane.

The joint part 19 and the first frame 9A are sheet-shaped. The second frame 9B has a thin portion, and has the first frame 9A on that portion.

However, as shown in FIGS. 3A and 3B, by forming a projection 21 that projects in the outer peripheral direction, for disassembling the assembly 14, it becomes possible to easily disassemble it by using the projection 21 serving as the starting point. As seen in FIG. 3B, the projection 21 protrudes not in the top or bottom surface direction but in the horizontal direction. The horizontal direction is a direction that is parallel to the top surface of the first frame 9A and the top surface of the second frame 9B.

As mentioned below with reference to FIGS. 4A and 4B, this configuration allows the projection 21 to easily be stripped from the second frame 9B upon disassembling of the assembly 14. Since, at any time other than during the disassembly, the projection 21 does not substantially protrudes upward or downward, any problems do not occur between the projection 21 and other objects.

Moreover, the projection 21 may be formed on an extended line of one of the two sides in the joint part 19. However, the projection 21 may not be in the extended direction. In that case, when the projection 21 projects in the direction where the gap between the outer peripheral part of the second frame 9B and the boundary portion G is comparatively broad, it becomes easier to disassemble the assembly 14. Therefore, the projecting direction of the projection 21 is not downward but leftward in FIG. 3A.

Furthermore, a difference in the level is preferably provided on the second frame 9B so that the adhesion planes between the second frame 9B and the first frame 9A, and the joint part 19 form the same plane. This is because, upon forming of the joint part 19, defects such as occurrence of the uneven adhesion force due to concentration of forming pressure to one side are prevented.

Additionally, by making the thickness of the first frame 9A to be smaller than the thicknesses of the joint part 19 and the projection 21, it becomes easier to disassemble the assembly 14.

Figure 3C:
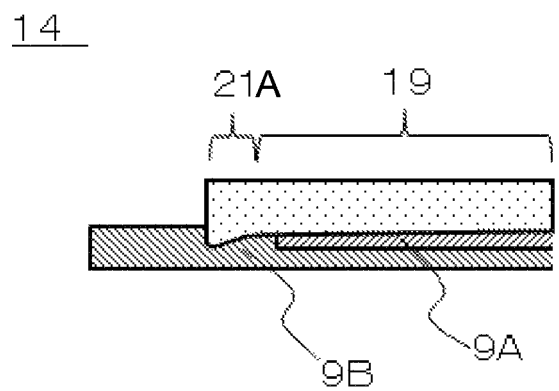

In addition, another modification of the projection 21 is shown in FIG. 3C. The thickness of the projection end portion 21a of FIG. 3C is larger than the thickness of the joint part 19. As described below with reference to FIGS. 4A and 4B, this configuration allows the projection 21 to be easily stripped from the second frame 9B in the method of disassembling the assembly 14.

The thickness refers to a size in the vertical direction against the top surface of the first frame 9A and the top surface of the second frame 9B.

<Disassembling Method>

Figure 4A:
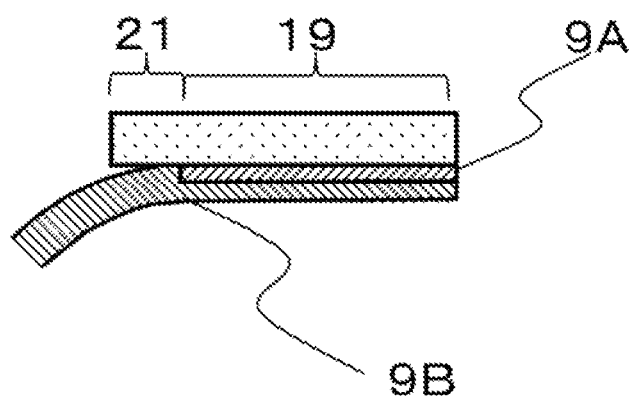
FIGS. 4A and 4B show schematic views for a method of disassembling the assembly of an electrolyte membrane, electrodes and a frame in the first embodiment of the invention.
Figure 4B:
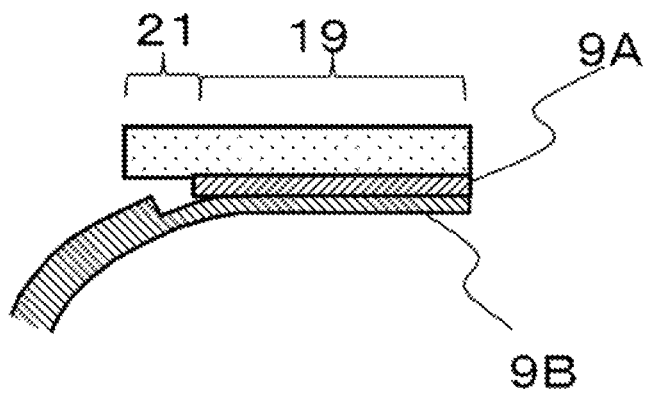

A method of disassembling the assembly 14 of the present embodiment is shown with reference to cross-sectional views of FIGS. 4A and 4B. At first, as shown in FIG. 4A, by causing the second frame 9B to warp against the projection 21 of the joint part 19 of the first frame 9A, the second frame 9B is stripped with the projection 21 serving as the starting point. In this case, as described above, when the projection 21 projects in a direction where the gap between the peripheral part of the second frame 9B and the boundary portion is comparatively broad, there is an advantage that the second frame 9B can easily be warped because the gripping margin thereof is large.

Furthermore, when the thicknesses of the joint part 19 and the projection 21 are smaller than the thickness of the second frame 9B, upon warping of the second frame 9B, the second frame 9B and the first frame 9A possibly warps in a state where they are joined to the joint part 19 and the projection 21. Therefore, at least either of the thickness of the joint part 19 or projection 21 is preferably comparatively larger than the thickness of the second frame 9B.

As shown in FIG. 4B, by stripping the second frame 9B with the projection 21 serving as the starting point, the projection 21 and the second frame 9B are separated from each other at the boundary surface therebetween. In that case, if the adhesion force of the joint part 19 is strong, there is a case in which the joint part 19 is fractured in the course of the separation. Even in such a case, stripping can be resumed with the fractured joint part 19 serving as the starting point, or if the similar projection 21 has been formed at another opposing corner part of the assembly 14, the second frame 9B can be stripped from the other side.

<Modification>

Figure 5A:
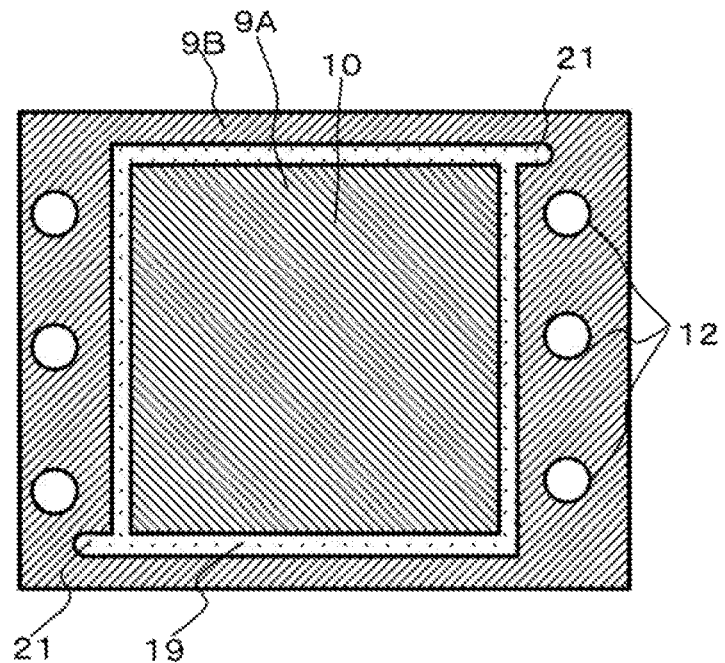
FIGS. 5A and 5B shows plan views of shapes of the frame in the first embodiment.
Figure 5B:
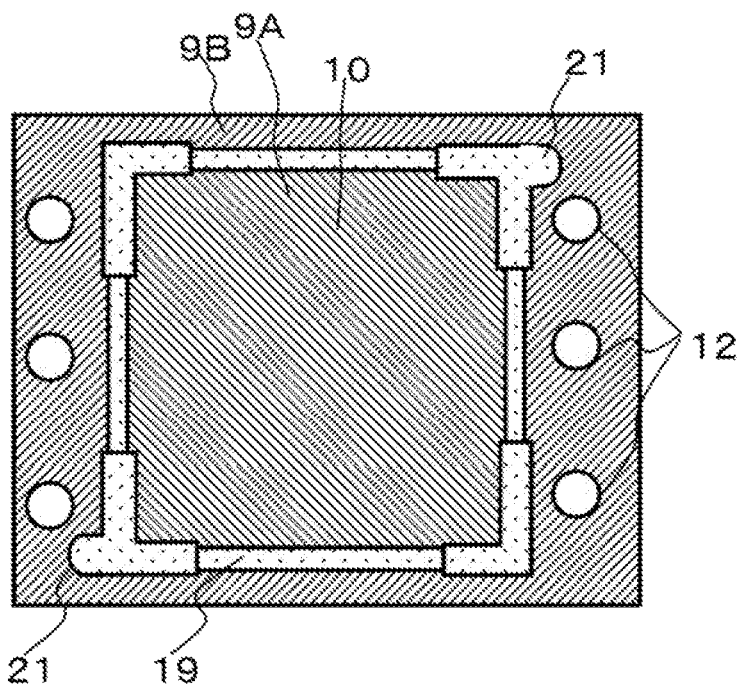

In the plan views of FIGS. 5A and 5B, a shape of the joint part 19 of the frame for facilitating stripping of the second frame 9B is shown.

In FIG. 5A, projections 21 are provided at two opposing corner parts of the joint part 19. The projections 21 can be stripped from the both.

Furthermore, as described above, in order to prevent the joint part 19 from fracturing due to its strong adhesive force, the adhesion width size of the joint part 19 in the linear portions other than corner parts is made smaller than the joint part 19 at the corner parts, in FIG. 5B.

This produces an effect that reduces warping of the joint part 19 due to contraction while forming the joint part 19 of the first frame 9A and the second frame 9B. When it is desired that such warping be further reduced, the thickness is preferably also made thinner in a portion where the width size is made smaller. In this way, by removing the joint part 19 and the second frame 9B from the assembly 14, the MEA 10 can be removed without causing damage thereto.

The joint part 19 is a frame-shaped tetragon with its center open. The joint part 19 may be a polygon other than a tetragon. There are two projections 21, and these projections 21 are located in positions opposing with each other in the joint part 19. There may be one projection 21. However, preferably, there are plural projections 21. It is not necessary to sake all the linear parts of the joint part 19 thinner than the corner parts thereof. It is sufficient that one linear part be thinner.

In addition, examples in the above-described embodiments can be combined.

A polymer electrolyte fuel cell including the assembly of the above embodiments is useful as a fuel cell that makes it possible to collect MEAs including precious metals from used fuel cells, defective products generated in the production steps, etc., without causing damage to the MEAs, and to recycle them, and is useful as a fuel cell that is used for potable power supplies, power supplies for electric vehicles, home degeneration, systems, etc.

What is claimed is:

1. An assembly, comprising:
   an electrolyte membrane; and
   a frame that holds the electrolyte membrane, wherein the frame includes a first frame that holds one surface of the electrolyte membrane, and a second frame that holds the other surface of the electrolyte membrane, the frame further includes a joint sheet that is on an interface of the first frame and the second frame and joins the first frame and the second frame, and the joint sheet has a projection protruding from a side surface of the joint sheet in a direction perpendicular to the side surface and in an outer peripheral direction to the assembly, and a width a of the projection in a direction parallel to the side surface is smaller than a width b of the projection in a direction perpendicular to the side surface,
   wherein the joint sheet is located over a first surface of the first frame and a second surface of the second frame,
   wherein the joint sheet and the projection are sheet-shaped and have a same upper surface, and the thickness of the projection is larger than the thickness of the joint sheet, and a part of the projection end portion enters the second frame.

2. The assembly according to claim 1, wherein the projection projects in a direction parallel to the first surface and the second surface.

3. The assembly according to claim 1, wherein the joint sheet is a frame-shaped polygon in plan view, and a corner part of the joint sheet includes the projection in plan view.

4. The assembly according to claim 1, wherein a width of the joint sheet at the corner part of a polygon is larger than a width of the joint sheet in a portion other than the corner part of the polygon in plan view.

5. The assembly according to claim 1, wherein two of the projections are present, and positions of the two projections are opposing to each other at the joint sheet in plan view.

6. The assembly according to claim 3, wherein the polygon is a tetragon.

7. The assembly according to claim 1, wherein the first frame is sheet-shaped, and a thickness of the joint sheet is larger than a thickness of the second frame at a lower part of the joint sheet.

8. The assembly according to claim 1, wherein a thickness of the projection is larger than the thickness of the second frame at a lower part of the projection.

9. The assembly according to claim 1, wherein the second frame has a thin portion, and the first frame is located on the thin portion.

10. A fuel cell, comprising plural single cell modules that are stacked, each of the modules includes the assembly of claim 1 and a pair of separators with the assembly placed therebetween.

11. The assembly according to claim 1, wherein the projection contacts only the second frame.

12. The assembly according to claim 1, wherein the projection is a starting point when disassembling the assembly.

* * * * *